US008688599B2

(12) United States Patent
Yoshizumi

(10) Patent No.: US 8,688,599 B2
(45) Date of Patent: Apr. 1, 2014

(54) TRANSPORTATION PROBLEM SOLVING DEVICE, TRANSPORTATION PROBLEM SOLVING METHOD, AND PROGRAM AND RECORDING MEDIUM THEREFOR

(75) Inventor: Takayuki Yoshizumi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 2258 days.

(21) Appl. No.: 10/936,410

(22) Filed: Sep. 8, 2004

(65) Prior Publication Data

US 2005/0096837 A1    May 5, 2005

(30) Foreign Application Priority Data

Oct. 31, 2003   (JP) ................... 2003-372249

(51) Int. Cl.
*G06Q 10/00*   (2012.01)
*G06Q 50/00*   (2012.01)
(52) U.S. Cl.
USPC ............................ 705/338; 705/7.23; 705/330
(58) Field of Classification Search
USPC .............. 705/1, 7–8, 7.23, 330, 338; 701/200
See application file for complete search history.

(56) References Cited

U.S. PATENT DOCUMENTS

| 6,374,178 | B2* | 4/2002 | Nakagawa et al. | 705/7.12 |
| 2001/0047237 | A1* | 11/2001 | Nakagawa et al. | 705/8 |
| 2001/0047285 | A1* | 11/2001 | Borders et al. | 705/8 |
| 2002/0082893 | A1* | 6/2002 | Barts et al. | 705/8 |
| 2003/0014286 | A1* | 1/2003 | Cappellini | 705/5 |
| 2003/0060924 | A1* | 3/2003 | Ye et al. | 700/217 |
| 2003/0078802 | A1* | 4/2003 | Yonezawa | 705/1 |
| 2004/0176962 | A1* | 9/2004 | Mann et al. | 705/1 |
| 2005/0080635 | A1* | 4/2005 | Groff et al. | 705/1 |

OTHER PUBLICATIONS

Montane, et al., Vehicle Routing Problems with Simultaneous Pick-up and Delivery Service, OPSEARCH, vol. 39, No. 1, 2002.*
Crainic, A Survey of Optimization Models for Long-Haul Freight Transportation, Univ. of Montreal, 2002.*
http://www.trl.ibm.com/projects/optsimm/logiopt/index_e.htm.

* cited by examiner

*Primary Examiner* — Daniel Vetter
(74) *Attorney, Agent, or Firm* — Gibb & Riley, LLC

(57) ABSTRACT

A transportation problem solving device for solving a transportation problem to optimize the end-to-end physical distribution consisting of a regional transportation and an inter-depot transportation, comprising a transformation section for adding a regional representative node representing a plurality of collection and delivery spots belonging to a depot to a model of inter-depot transportation, and incorporating the regional transportation between each of the plurality of collection and delivery spots belonging to the depot and the depot into a part of the model of inter-depot transportation as the inter-depot transportation between the depot and the regional representative node, an inter-depot transportation computing section for solving the transportation problem, based on a transformation model in which the regional transportation is incorporated into the inter-depot transportation, and computing a transportation plan for each delivery order in an inter-depot transportation portion, when a plurality of transport requests are input, and an output section for outputting the transportation plan computed by the inter-depot transportation computing section.

12 Claims, 15 Drawing Sheets

Figure 2

Transport request in end-to-end physical distribution problem

| Transport request ID | Place of departure | Place of destination | Time window | Weight (kg) |
|---|---|---|---|---|
| 1 | Tokyo_spot A | Osaka_spot C | 7/3/9:00–7/9/22:00 | 100 |
| 2 | Fukuoka_spot B | Osaka_spot A | 7/5/9:00–7/7/17:00 | 60 |
| 3 | Fukuoka_spot A | Tokyo_spot C | 7/4/10:00–7/9/9:00 | 70 |
| ... | | | | |

Figure 6

Required time matrix (unit: minute)

| | Depot | Collection and delivery spot A | Collection and delivery spot B | Collection and delivery spot C | Collection and delivery spot D | .... |
|---|---|---|---|---|---|---|
| Depot | — | — | — | — | — | |
| Collection and delivery spot A | 10 | — | — | — | — | |
| Collection and delivery spot B | 22 | 16 | — | — | — | |
| Collection and delivery spot C | 15 | 30 | 11 | — | — | |
| Collection and delivery spot D | 23 | 9 | 19 | 6 | — | |
| .... | | | | | | |

Figure 7

Transport request set

| Transport request ID | Place of departure | Place of destination | Time window | Weight (kg) |
|---|---|---|---|---|
| 1 | Depot | Collection and delivery spot A | 7/8/9 : 00–7/9/20 : 00 | 20 |
| 2 | Depot | Collection and delivery spot B | 7/9/9 : 00–7/9/17 : 00 | 3 |
| 3 | Collection and delivery spot A | Depot | 7/10/10 : 00–7/10/20 : 00 | 15 |
| 4 | Collection and delivery spot C | Depot | 7/9/10 : 00–7/12/22 : 00 | 15 |
| ... | ... | ... | ... | ... |

Figure 8

Transport means set

| Transport means ID | Available time zone | Maximum payload (kg) | Cost |
|---|---|---|---|
| 1 | 7/9/10 : 00–7/9/18 : 00 | 1000 | 5 |
| 2 | 7/9/12 : 00–7/9/20 : 00 | 1000 | 7 |
| 3 | 7/10/10 : 00–7/10/18 : 00 | 500 | 6 |
| ... | | | ... |

Operation plan of transport means 1

| Location | Time | Action |
|---|---|---|
| Depot | 7/9/10 : 00 | Load transport requests 1 and 2. |
| Collection and delivery spot A | 7/9/10 : 10 | Unload transport request 1. |
| Collection and delivery spot C | 7/9/10 : 40 | Load transport request 4. |
| . . . . | | |

Figure 11

Transport request set

| Transport request ID | Place of departure | Place of destination | Time window | Weight (kg) |
|---|---|---|---|---|
| 1 | Tokyo | Osaka | 7/7/9 : 00–7/12/20 : 00 | 50 |
| 2 | Fukuoka | Aomori | 7/7/17 : 00–7/13/10 : 00 | 32 |
| 3 | Fukuoka | Tokyo | 7/6/15 : 00–7/11/17 : 00 | 70 |
| ..... | | | | |

Figure 12

Transport means set

| Transport means ID | Place of departure | Place of destination | Required time (minute) | Departure permitted time zone | Cost | Maximum payload (kg) |
|---|---|---|---|---|---|---|
| 1 | Tokyo | Osaka | 300 | 7/7/10:00–7/7/12:00 | 10 | 1000 |
| 2 | Fukuoka | Osaka | 500 | 7/7/13:00–7/7/16:00 | 30 | 1000 |
| 3 | Fukuoka | Nagoya | 220 | 7/8/23:00–7/9/2:00 | 20 | 500 |
| ... | | | | | | |

Figure 13

Transport request schedule

| Transport request ID | Transportation route |
|---|---|
| 1 | Tokyo -- (transport means 1) → Osaka |
| 2 | Fukuoka -- (transport means 2) → Osaka -- (transport means 4) → Tokyo -- (transport means 5) → Aomori |
| 3 | Fukuoka -- (transport means 2) → Osaka -- (transport means 4) → Tokyo |
| .... | |

Figure 14

Transport means operation plan

| Transport means ID | Departure time | Arrival time | Load transport request ID |
|---|---|---|---|
| 1 | 7/7/10 : 00 | 7/7/15 : 00 | 1, 4, 5 |
| 2 | 7/7/13 : 00 | 7/7/21 : 20 | 2, 6, 7 |
| 3 | 7/8/23 : 30 | 7/8/3 : 10 | 8 |
| .... | | | |

TRANSPORTATION PROBLEM SOLVING DEVICE, TRANSPORTATION PROBLEM SOLVING METHOD, AND PROGRAM AND RECORDING MEDIUM THEREFOR

DETAILED DESCRIPTION OF THE INVENTION

1. Field of the Invention

The present invention relates to a transportation problem solving device, a transportation problem solving method, and its program and recording medium. More particularly, this invention relates to a transportation problem solving device, a transportation problem solving method, and its program and recording medium for optimizing the physical distribution consisting of a regional transportation in which transport means belonging to a depot that resides for each region collects and delivers the delivery order while making the round of a plurality of collection and delivery spots belonging to said depot, and an inter-depot transportation in which transport means allocated between each depot transports a transport request for the delivery order between said each depot in a plurality of regions.

2. Background Art

In our time when a large number of delivery orders circulate, it is an important subject to optimize the physical distribution. The end-to-end physical distribution is accomplished by linkage between the regional transportation and the inter-depot transportation. For example, a transport request from a consignor to a destination is firstly transported from the consignor to a depot to which the consignor belongs by the regional transportation. Then, it is transported to a depot in a region to which the destination belongs by the inter-depot transportation, and finally from the depot to which the destination belongs to the end destination by the regional transportation.

Conventionally, a solver for obtaining the optimal solution of a regional transportation problem and a solver for obtaining the optimal solution of an inter-depot transportation problem separately reside (e.g., refer to non-patent document 1). However, the regional transportation problem and the inter-depot transportation problem are greatly different in the model, and could not be solved by the same method. Therefore, when an end-to-end physical distribution problem is to be solved, the inputs of the end-to-end physical distribution are provided separately into a regional transportation portion and an inter-depot transportation portion to solve the end-to-end physical distribution problem independently in separate solvers.

For example, after a certain length of time (e.g., 24 hours) at the beginning and at the end in a time window (from an occurrence time to a time limit of delivery for the transport request) of the end-to-end transport request was allocated to the regional transportation for collection and the regional transportation for delivery, the regional transportation problem was solved based on the allocated time, and the inter-depot transportation problem was solved based on the remaining time, both problems being solved independently of each other.

DISCLOSURE OF THE INVENTION

Problems to be Solved by the Invention

A problem here is that a correct EST (earliest start time) in the inter-depot transportation problem is not known before the regional transportation problem for collection of delivery order is solved, and a correct EST for delivery in the regional transportation problem is not known before the inter-depot transportation problem is solved. Therefore, it is difficult to optimally allocate the time window for the end-to-end transport request to the regional transportation and the inter-depot transportation, resulting in a problem that even if the optimal solutions of the regional transportation and the inter-depot transportation are computed based on the time allocated according to a certain criterion, an optimal transportation plan is not always obtained as the overall end-to-end transportation.

For example, if the allocated time of the regional transportation is too short, some requests may not be transported, or conversely if it is too long, the allocated time of the inter-depot transportation is shorter than necessary, resulting in a problem of the low optimality of the inter-depot transportation portion.

Also, since the regional transportation is usually conducted in a unit of day, when there is enough time for delivery, there is a room for selecting the date on which the collection and delivery of delivery order are conducted by the regional transportation. Depending on the selected collection and delivery date, it is possible to reduce the number of vehicles required for the regional transportation and the cost.

However, with the conventional method, since the date of collection and delivery is prefixed for each delivery order, there is no room for optimizing the date of collection and delivery in the regional transportation, resulting in a problem that the number of vehicles in the regional transportation is not optimized (minimized).

Thus, it is an object of this invention to provide a transportation problem solving device, a transportation problem solving method, and its program and recording medium that can solve the above-mentioned problems. This object is achieved in combination of the features as defined in the independent Claims in the Claims of the invention. Also, the dependent Claims provide more beneficial examples of the invention.

SUMMARY OF THE INVENTION

That is, according to a first form of the invention, there is provided a transportation problem solving device for solving a transportation problem to optimize the physical distribution consisting of a regional transportation in which transport means belonging to a depot that resides for each region collects or delivers the delivery order while making the round of a plurality of collection and delivery spots belonging to the depot, and an inter-depot transportation in which transport means allocated between each depot transports a transport request for delivery order between the each depot in a plurality of regions, comprising a transformation section for adding a regional representative node representing the plurality of collection and delivery spots belonging to the depot to a model of the inter-depot transportation, and incorporating the regional transportation between each of the plurality of collection and delivery spots belonging to the depot and the depot into a part of the model of the inter-depot transportation as the inter-depot transportation between the depot and the regional representative node, an inter-depot transportation computing section for solving the transportation problem, based on a transformation model in which the regional transportation is incorporated into the inter-depot transportation, and computing a transportation plan for each delivery order in an inter-depot transportation portion, when a plurality of transport requests are input, and an output section for outputting the transportation plan computed by the inter-depot transportation computing section. Also, a transportation problem solving method, and a program and a recording medium for the transportation problem solving device are provided.

The outline of the invention does not enumerate all the necessary features of the invention, but a sub-combination of those features may constitute the invention.

Advantages of the Invention

With this invention, it is possible to optimize the end-to-end physical distribution comprising the regional transportation and the inter-depot transportation.

BRIEF DESCRIPTION OF THE DRAWINGS

FIG. 2 is a view showing one example of a transport request set that are input into the end-to-end physical distribution problem;

FIG. 6 is a view showing one example of a required time matrix indicating a required time defined between arbitrary two points in the regional transportation;

FIG. 7 is a view showing one example of a transport request set that is input into the regional transportation problem;

FIG. 8 is a view showing one example of a transport means set that is input into the regional transportation problem;

FIG. 11 is a view showing one example of transport request set that is input into the inter-depot transportation problem;

FIG. 12 is a view showing one example of a transport means set that is input into the inter-depot transportation problem;

FIG. 13 is a view showing one example of a transport request schedule that is output from the inter-depot transportation problem;

FIG. 14 is a view showing one example of an operation plan for each transport means that is output from the inter-depot transportation problem;

PREFERRED EMBODIMENT

The preferred embodiments of the present invention will be described below. However, it is not intended that the invention as defined in the Claims is limited to the specific embodiments, and all the combinations of the features as described in the embodiments are not requisite for solving means of the invention.

Figure 1:
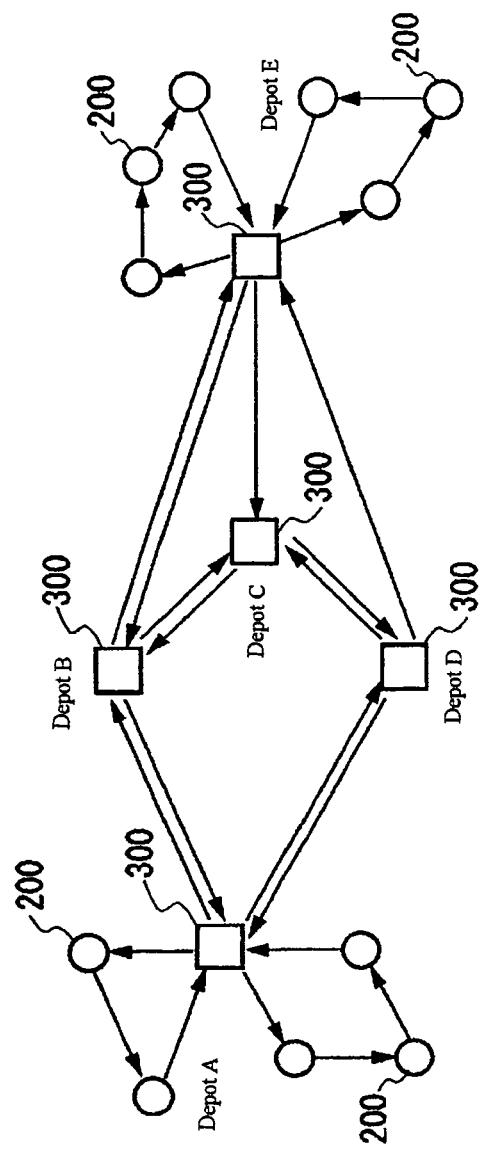
FIG. 1 is a diagram showing one example of a model of an end-to-end physical distribution problem.

FIG. 1 is a diagram showing one example of a model of an end-to-end physical distribution problem according to an embodiment of the invention. In this embodiment, the square denotes a collection and distribution base 300 that resides for each region, and the circle denotes a collection and delivery spot 200 of regional transportation belonging to the depot. Also, the arrow indicates the vehicle that transports the delivery order. An end-to-end physical distribution links a regional transportation and an inter-depot transportation through the depot 300. The regional transportation is the physical distribution in which the vehicle belonging to the depot 300 that resides for each region collects and delivers the delivery order while making the round of a plurality of collection and delivery spots 200 belonging to the depot 300, and finally comes back to the original depot 300. The depot is the place of departure or destination to transport the delivery order. Also, the inter-depot transportation means that the vehicle allocated between each depot 300 transports the delivery order between each depot 300 in a plurality of regions. Herein, the vehicle is one example of transport means in this invention. Other examples of transport means include train, airplane, and bike.

For example, a transport request from one collection and delivery spot 200 in Tokyo to another collection and delivery spot 200 in Osaka is firstly transported from the collection and delivery spot 200 to the depot 300 in Tokyo through the regional transportation in Tokyo. Then, it is transported from the depot 300 in Tokyo to the depot 300 in Osaka through the inter-depot transportation. At last, it is transported from the depot 300 in Osaka to the final collection and delivery spot 200 through the regional transportation in Osaka.

The inputs of the end-to-end physical distribution problem are largely classified into input parameter for each region concerning the regional transportation, input parameter concerning the inter-depot transportation, and input parameter concerning the transport request. Examples of the input parameter concerning the regional transportation include a collection and delivery spot set, a transport means set, and a required time matrix for each depot 300. Examples of the input parameter concerning the inter-depot transportation include a transport means set. The attributes of the collection and delivery spot set, the required time matrix and the transport means set in the inter-depot transportation and the regional transportation will be described later.

FIG. 2 is a view showing one example of a transport request set that is input into the end-to-end physical distribution problem. The transport request set in the end-to-end physical distribution problem has a transport request ID associated with the attributes such as the place of departure, place of destination, time window and weight. The place of departure and the place of departure are elements of the collection and delivery spot set in the regional transportation. In this example of the invention, Tokyo_spot A represents the collection and delivery spot A belonging to the depot 300 in Tokyo, and Osaka_spot C represents the collection and delivery spot C belonging to the depot 300 in Osaka. For example, a transport request ID1 is firstly collected from the collection and delivery spot A in Tokyo to the depot 300 in Tokyo through the regional transportation, then transported from the depot 300 in Tokyo to the depot 300 in Osaka through the inter-depot transportation, and lastly delivered from the depot 300 in Osaka to the collection and delivery spot C in Osaka through the regional transportation. The time window indicates the time zone in which the delivery order corresponding to each transport request must be transported. For example, in FIG. 2, the transport request 1 (ID=1) represents that the delivery order having a weight of 100 kg must be delivered from Tokyo_spot A to Osaka_spot C from 7/3/9:00 till 7/9/22:00.

The transportation problem solving device 100 according to the embodiment has a first object of obtaining the solutions of the transportation plan for the inter-depot transportation portion and the time window for the regional transportation portion, employing a transformation model in which the regional transportation model is approximated with a part of the inter-depot transportation model, in solving the above end-to-end physical distribution problem.

Figure 3:
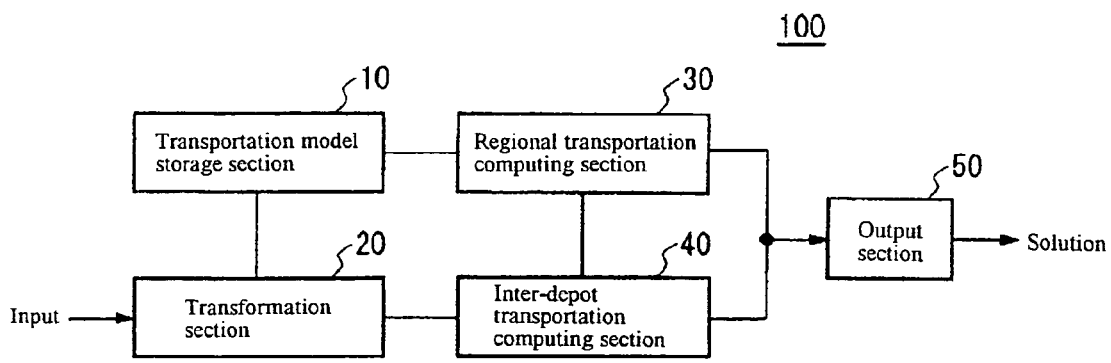
FIG. 3 is a block diagram showing the functional configuration of a transportation problem solving device 100 according to an embodiment of the invention.

FIG. 3 is a block diagram showing the functional configuration of the transportation problem solving device 100. The transportation problem solving device 100 comprises a transportation model storage section 10 for storing the regional transportation model for each region and the inter-depot transportation model, a transformation section 20 for generating a transformation model by incorporating the regional transportation model into a part of the inter-depot transportation model, an inter-depot transportation computing section 40 for computing the transportation plan for each delivery order in the inter-depot transportation portion and the time window for each delivery order in the regional transportation portion by solving the transportation problem based on the transformation model, and an output section 50 for outputting a solution from the inter-depot transportation computing section 40. With this configuration, the transportation problem solving device 100 provides the optimal solution between the transportation plan of the inter-depot transportation portion and the time window of the regional transportation portion for each delivery order, based on the transformation model that is the inter-depot transportation model having incorporated the regional transportation model.

The transportation problem solving device 100 further comprises a regional transportation computing section 30 for computing the collection and delivery schedule for each delivery order in the regional transportation, based on the time window for each delivery order in the regional transportation portion, which is solved by the inter-depot transportation computing section 40, and the regional transportation model stored in the transportation model storage section 10. An output section 50 outputs the collection and delivery schedule for each delivery order in the regional transportation that is computed by the regional transportation computing section 30.

Thereby, the transportation problem solving device 100 provide a specific delivery schedule for each delivery order, employing the time window for the regional transportation appropriately allocated by the inter-depot transportation computing section 40. As a result, the transportation problem solving device 100 provides the transportation plan for each delivery order in the inter-depot transportation portion and the regional transportation portion that is the optimal solution of the end-to-end physical distribution problem.

Figure 4:
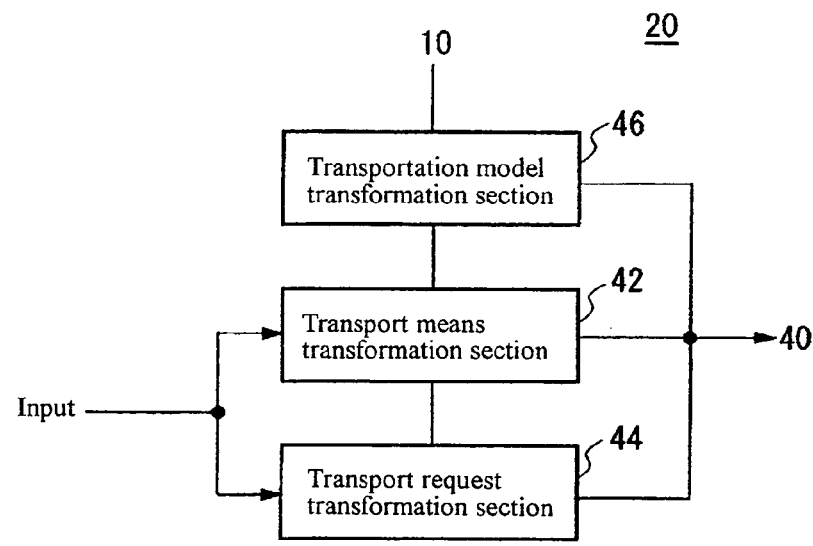
FIG. 4 is a block diagram showing the functional configuration of a transformation section 20.

FIG. 4 is a block diagram showing the functional configuration of the transformation section 20. The transformation section 20 comprises a transportation model transformation section 46 for transforming the end-to-end transportation model into the transformation model having a form of the inter-depot transportation model by replacing each regional transportation model stored in the transportation model storage section 10 with a part of the inter-depot transportation model, a transport means transformation section 42 for transforming each transport means for the regional transportation into the transport means in the inter-depot transportation, and a transport request transformation section 44 for transforming each transport request of the regional transportation portion into the transport request in the transformation model by dividing each end-to-end transport request into the regional transportation portion and the inter-depot transportation portion.

The transportation model transformation section 46, the transport request transformation section 44 and the transport means transformation section 42 output the transformation result to the inter-depot transportation computing section 40. The inter-depot transportation computing section 40 computes the transportation plan for the inter-depot transportation portion and the time window for the regional transportation portion in the end-to-end physical distribution problem, based on the transformation model generated by the transportation model transformation section 46, the transport means transformed by the transport means transformation section 42, and the transport request transformed by the transport request transformation section 44.

The details of the regional transportation problem and the inter-depot transportation problem will be described below.

Figure 5:
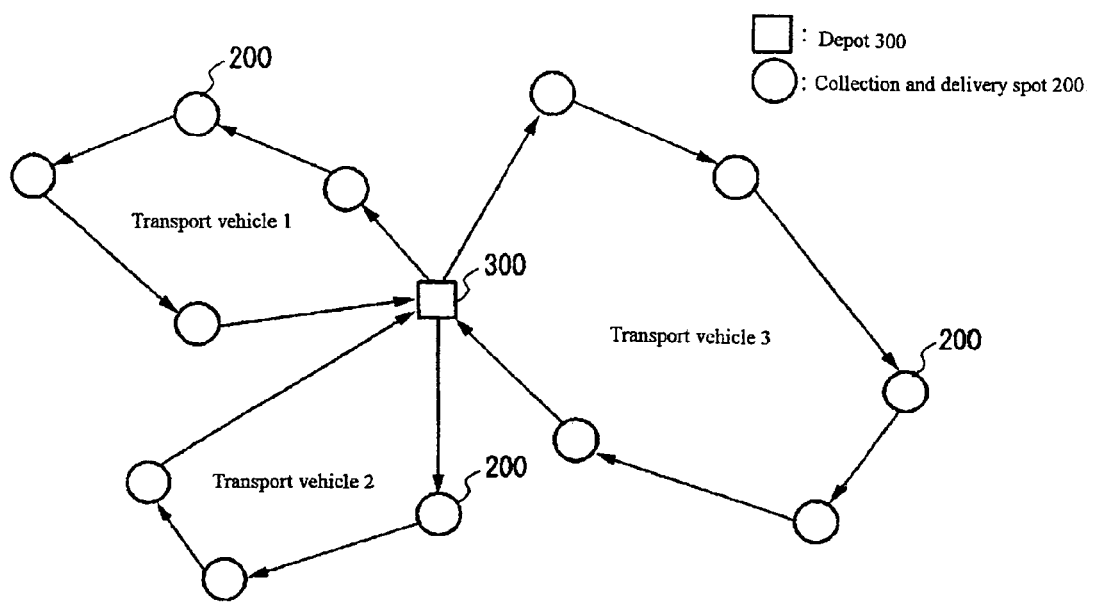
FIG. 5 is a diagram showing one example of a regional transportation model.

FIG. 5 is a diagram showing one example of the regional transportation model. In this example, three transport means belonging to the depot 300 make the round of a plurality of collection and delivery spots 200. For example, a transportation vehicle 1 starts from the depot 300, and makes the round of four collection and delivery spots 200 successively to collect or deliver the delivery order. In FIG. 5, the route of transportation vehicle is illustrative. The regional transportation computing section 30 selects a plurality of collection and delivery spots 200 of which each transportation vehicle makes the round, in accordance with the inputs of a set of collection and delivery spots 200, a transport request set, and a transportation vehicle set, and decides the route through which the transportation vehicle makes the round of selected collection and delivery spots 200 most efficiently. Generally, some transport requests for collection and delivery of delivery order are mixed in the regional transportation. Therefore, the output of the regional transportation problem is the input of the inter-depot transportation problem, and vice versa.

The inputs into the regional transportation problem include the depot, a collection and delivery spot set, a transport request set, a transport means set, and a required time matrix indicating the required time between depot and collection and delivery spot. The depot corresponds to the place of departure in the delivery of delivery order and the place of destination in the collation of delivery order, and the collection and delivery spot corresponds to the consignor (occurrence spot of delivery order) or the consignee. The required time is defined between two points in the depot and collection and delivery spot set by the required time matrix.

FIG. 6 is a view showing one example of the required time matrix. The required time matrix defines the required time of transportation between the depot and plural collection and delivery spots. For example, in this example, it takes 10 minutes to move from the depot to the collection and delivery spot A (or from the collection and delivery spot A to the depot).

FIG. 7 is a view showing one example of the transport request set in the regional transportation problem. The transport request set has the transport request ID associated with the attributes such as the place of departure, place of destination, time window and weight. One of the place of departure and the place of destination is the depot, and the other is a factor in the collection and delivery spot set. That is, when the place of departure is the depot, the delivery of delivery order from the depot to the collection and delivery spot is indicated, or when the place of destination is the depot, the collection of delivery order from the collection and delivery spot to the depot is indicated.

FIG. 8 is a view showing one example of the transport means set in the regional transportation problem. The transport means set has each transport means ID associated with the attributes such as available time zone, maximum payload, and cost. Each transport means is employed, providing that it starts from the depot within a range of available time zone, makes the round of several collection and delivery spots to treat the transport request and comes back to the depot. The maximum payload indicates the maximum value of the total weight of transport requests loaded at the same time. The transport request beyond the maximum payload can not be loaded together. The cost occurs when the transport means is employed, and does not occur unless the transport means is employed. Also, the cost is fixed for each transport means, irrespective of the actual time or payload.

Figures 9, 10:
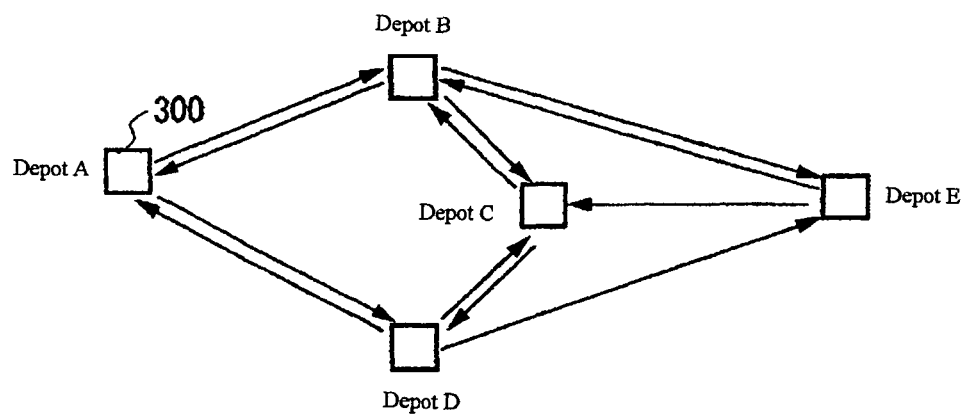
FIG. 9 is a view showing one example of an operation plan for each transport means that is output from the regional transportation problem.
FIG. 10 is a diagram showing one example of an inter-depot transportation model.

FIG. 9 is a view showing one example of an operation plan for each transport means that is output from the regional transportation problem. In the operation plan for each transport means, a drop-in time and a drop-in action are defined corresponding to each location where the transport means drops in. In this example, the transport means starts from the depot on July 9 at 10:00, and makes the round while collecting and delivering transport request in the order of depot A and collection and delivery spot C. An objective function in the regional transportation problem is defined as a sum of the costs of used transport means, and the object of optimization is to draw up the operation plan to minimize the objective function. When the transport request is not satisfied, the objective function has additionally a penalty cost according to the number of unsatisfied transport requests. Thereby, the operation plan to minimize the cost of physical distribution including the cost occurring when the transport request is not satisfied is output.

FIG. 10 is a diagram showing one example of the inter-depot transportation model. The inter-depot transportation is the physical distribution between depots that are sporadic nationwide or worldwide. The given transport request is transported, employing the transport means defined between depots. In this example, the inter-depot transportation comprises five depots 300. The arrow between depots 300 indicates the transport means. For example, the arrow from the depot A to the depot B indicates that some transport means is defined from the depot A to the depot B. Also, through no transport means is defined between the depot A and the depot C, transportation between the depots A and C is allowed via the depot B or D. A plurality of transport means may be defined in the same leg.

The inputs into the inter-depot transportation problem are the transport request set and the transport means set.

FIG. 11 is a view showing one example of transport request set that is input into the inter-depot transportation problem. The transport request set has each transport request ID associated with the attributes such as place of departure, place of destination, time window and weight. It is required that each transport request is transported from the place of departure to the place of destination within a range of transportable time zone.

FIG. 12 is a view showing one example of the transport means set that is input into the inter-depot transportation problem. The transport means set has each transport means ID associated with the attributes such as place of departure, place of destination, required time, departure permitted time zone, cost, and maximum payload. Each transport means transports the transport request at the place of departure to the place of destination in a required time. Also, a plurality of transport requests can be transported at the same time, if they are within the maximum payload. Also, the departure time must be within the range of departure permitted time zone. Though the cost occurs irrespective of the load capacity, the cost does not occur for the unused transport means. In this way, the attributes of cost and maximum payload are set up individually for each transport means. Accordingly, when a plurality of transport means are set up in the same interval, the attributes of cost and maximum payload may be different.

The inter-depot transportation computing section 40 solves the inter-depot transportation problem in accordance with the following algorithm. First of all, the candidates for the transportation route of each transport request are ranked in the order of the required time for each route or the distance of each route, for example. Then, a tracking allocation problem is solved, providing that all the transport requests are transported on the route at the first ranking. If the allocation of tracking is decided, the transportation cost of each track is divided by the number of transport requests that are transported on the track. In this way, the transportation cost concerning all the tracking requests is calculated, and the sum of transportation cost of each transport request is calculated as the transportation cost for the overall inter-depot transportation.

Then, the transportation cost for the overall inter-depot transportation when the transportation route for any transport request is changed to the second ranking or beyond is calculated successively. And when the lower cost calculation result is obtained, the transportation plan is replaced with a combination of transportation routes at that time. And this processing is repeated until the calculation result is converged.

The outputs of the inter-depot transportation problem are the transport request schedule indicating the transportation route and conveying means for each transport request and the operation plan for each transport means. They are shown in FIGS. 13 and 14.

FIG. 13 is a view showing one example of the transport request schedule that is output from the inter-depot transportation problem. In the transport request schedule, the transportation route from the d and d base that is the starting point of inter-depot transportation to the depot that the end point of inter-depot transportation and the transport means ID for use in the transportation are defined, associated with each transport request ID.

FIG. 14 is a view showing one example of the operation plan for each transport means that is output by the inter-depot transportation computing section 40. In the operation plan, the departure time and arrival time of transportation between the depots preset for each transport means and the transport request ID loaded in the transportation are defined, associated with each transport means ID.

Figure 15:
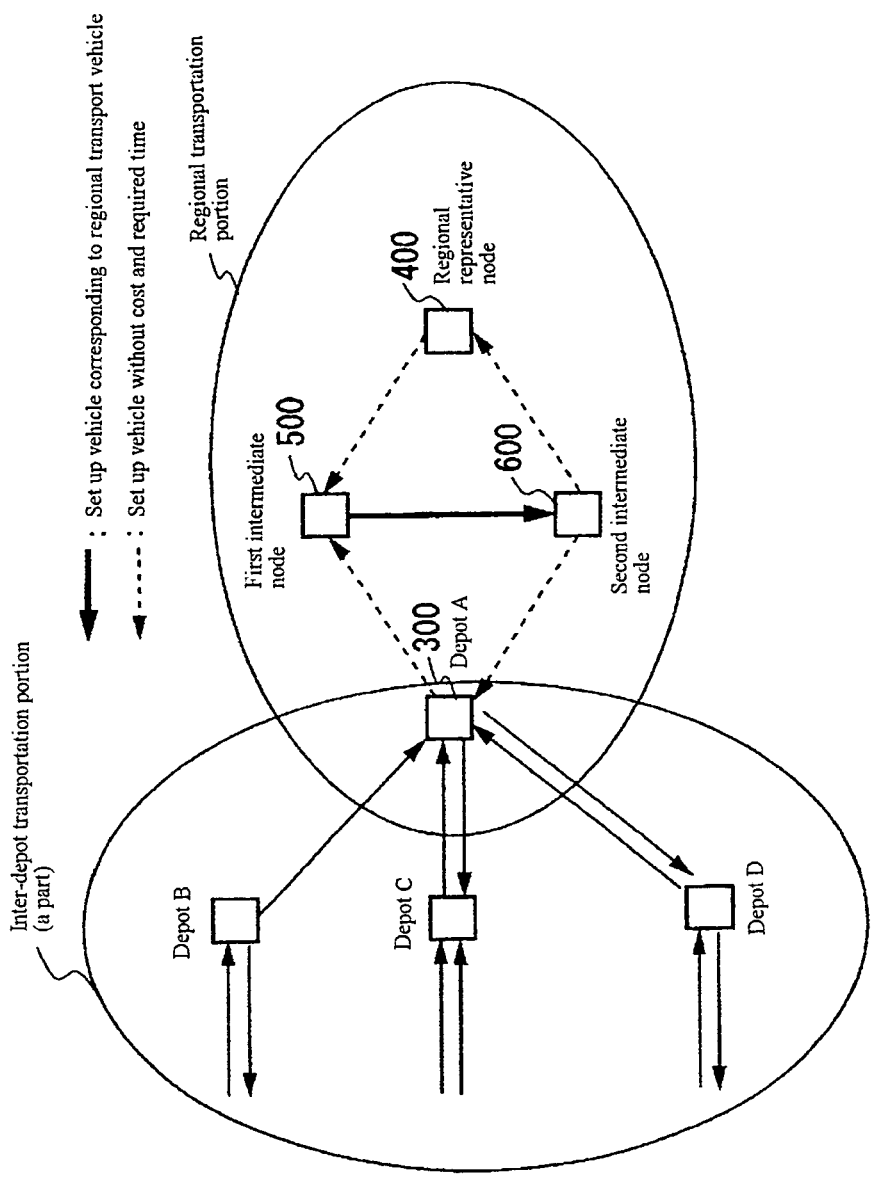
FIG. 15 is a diagram showing one example of a transformation model in which a regional transportation is incorporated into the inter-depot transportation.

FIG. 15 is a diagram showing one example of the transformation model in which the regional transportation is incorporated into the inter-depot transportation. The transformation section 20 as described in FIG. 3 adds a regional representative node 400 representing a plurality of collection and delivery spots 200 belonging to the depot 300 as shown in FIG. 5 to the inter-depot transportation model. And the regional transportation model is incorporated into the inter-depot transportation model by transforming each transport request between the depot 300 and a plurality of collection and delivery spots 200 in the regional transportation to the transport request between the depot 300 and the regional representative node 400 in the inter-depot transportation.

In FIG. 15, a part concerning the depot A of the transformation model is illustrated. The transformation section 20 transforms the collection of delivery order concerning the depot A, or each transport request from the collection and delivery spot 200 belonging to the depot A to the depot A, into the transport request from the regional representative node 400 to the depot A. Also, the delivery of delivery order concerning the depot A, or each transport request from the depot A to a plurality of collection and delivery spots 200 belonging to the depot A is transformed into the transport request from the depot A to the regional representative node 400. In this way, the transformation section 20 represents the transport request in the regional transportation as the transport request in the inter-depot transportation.

The transformation section 20 further adds a first intermediate node 500 and a second intermediate node 600 between the depot A and the regional representative node 400. And the transport means is defined so that the delivery of delivery order from the depot A to the regional representative node 400 and the collection of delivery order from the regional representative node 400 to the depot are made through the first intermediate node 500 and the second intermediate node 600 in the same order. At this time, the transport means in the regional transportation corresponds one-to-one to the transport means in the inter-depot transportation defined between the first intermediate node 500 and the second intermediate node 600.

For example, in this example, the transport means from the first intermediate node 500 to the second intermediate node 600 is defined. Thereby, the collection of delivery order in the depot A is routed from the regional representative node 400 to the first intermediate node 500 to the second intermediate node 600 to the depot A, and the delivery of delivery order from the depot A is routed from the depot A to the first intermediate node 500 to the second intermediate node 600 to the regional representative node 400. That is, the transport request for any collection of delivery order or delivery of delivery order is routed from the first intermediate node 500 to the second intermediate node 600.

And the transformation section 20 sets up a parameter indicating a characteristic of the transport means in the regional transportation in the transport means from the first intermediate node 500 to the second intermediate node 600. Thereby, the transformation section 20 reflects the characteristic of the regional transportation problem onto the model of inter-depot transportation problem. Examples of the parameter indicating the characteristic of transport means in the regional transportation will be described later in FIG. 16. Moreover, the transformation section 20 assigns the collection of delivery order and delivery of delivery order in the regional transportation to the same vehicle in the inter-depot transportation, whereby the efficient transportation model for computing the collection of delivery order and the delivery of delivery order at the same time is created.

Herein, in the regional transportation, the collection and delivery of delivery order are mixed in one round of one transport means. Accordingly, the transport means of the regional transportation portion delivers the delivery order to the place of destination, and collects the new delivery order, thereby dealing with any transport request in which the total amount of load collected in one round exceeds the maximum payload of the transport means that is the load capacity allowable at the same time. Thus, the transformation section 20 applies the maximum payload of the transport means belonging to the depot A in the regional transportation multiplied by a factor larger than 1 based on the rule of thumb as the maximum amount of load in the transport means from the first intermediate node 500 to the second intermediate node 600. Also, the transformation section 20 allocates a sufficient number of transport means having no transportation cost and no required time between the first intermediate node 500 or the second intermediate node 600 and the depot A, and between the first intermediate node 500 or the second intermediate node 600 and the regional representative node 400.

In this way, the transformation section 20 creates a transformation model in which the regional transportation problem is incorporated into the inter-depot transportation problem. And the inter-depot transportation computing section 40 solves the end-to-end transportation problem, based on the transformation mode having the regional transportation problem incorporated by the transformation section 20. As a result, the inter-depot transportation computing section 40 computes the transportation plan of the inter-depot transportation portion and the time window of the regional transportation portion. The output section 50 may output the transportation plan of the inter-depot transportation portion and the time window of the regional transportation portion that are obtained up to this stage.

The regional transportation computing section 30 solves the regional transportation problem, based on the time window of the regional transportation solved by the inter-depot transportation computing section 40, and the regional transportation model for each region stored in the transportation model storage section 10, and calculates the specific transportation plan for each delivery order in the regional transportation. As a result, the transportation problem solving device 100 outputs the transportation plan for each delivery order in which the overall end-to-end physical distribution consisting of the regional transportation and the inter-depot transportation is optimized.

Figure 16:
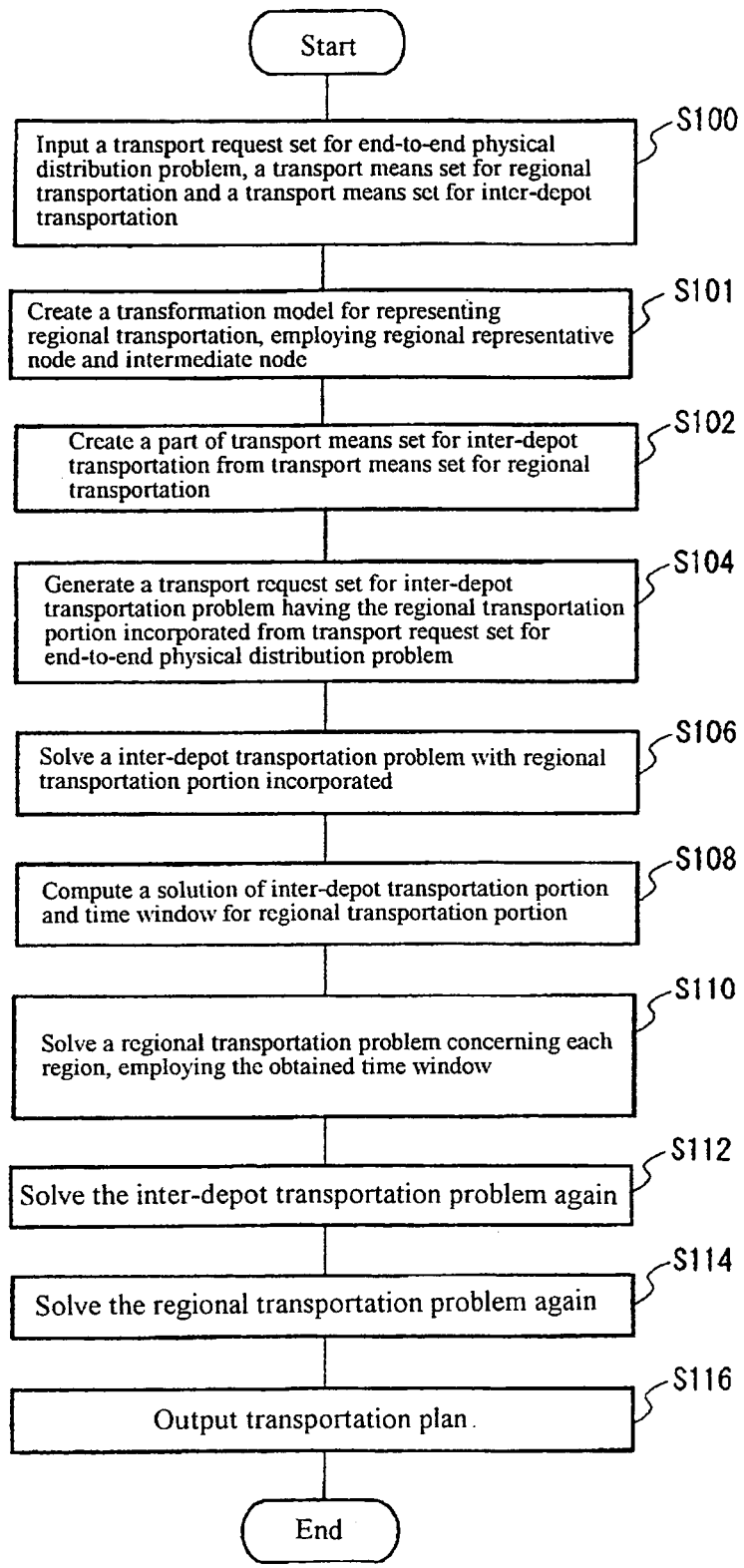
FIG. 16 is a flowchart showing one example of a procedure for solving an end-to-end physical distribution problem in the transportation problem solving device 100.

FIG. 16 is a flowchart showing one example of a procedure for solving an end-to-end physical distribution problem in the transportation problem solving device 100. Firstly, the transportation problem solving device 100 accepts the inputs of a transport request set of the end-to-end physical distribution problem, a transport means set in the regional transportation, and a transport means set in the inter-depot transportation (S100). Then, the transportation model transformation section 46 creates a transformation model in which the regional transportation model is incorporated into the inter-depot transportation model by representing each regional transportation mode for each region stored in the transportation model storage section 10, using the regional representative node 400 and two intermediate nodes (500, 600) (S101).

The transport means transforming section 42 transforms each of a plurality of transport means in the regional transportation into each of a plurality of transport means from the first intermediate node 500 to the second intermediate node 600. That is, it creates a part of the transport means set of the inter-depot transportation from the transport means set of the regional transportation (S102). In this case, the parameter indicating the characteristic of the transport means in each regional transportation is set up as the attribute of the transport means from the first intermediate node 500 to the second intermediate node 600. For example, the average round time of the transport means belonging to the depot A in making the round of collection and delivery spots in the regional transportation is employed as the required time of transportation from the first intermediate node 500 to the second intermediate node 600. Also, the cost of the transport means belonging to the depot A in making the round of collection and delivery spots in the regional transportation is employed as the cost of transportation from the first intermediate node 500 to the second intermediate node 600. Moreover, the maximum payload of the transport means belonging to the depot A in the regional transportation multiplied by a factor larger than 1 is employed as the maximum amount of load from the first intermediate node 500 to the second intermediate node 600 corresponding to the transport means. The factor may be determined based on the rule of thumb.

Then, the transport request transforming section 44 transforms the regional transportation portion among the elements in the transport request set of the end-to-end physical distribution problem, namely, each transport request between the depot 300 and the collection and delivery spot 200, into the transport request between the depot 300 in the inter-depot transportation and the regional representative node 400. That is, the transport request set for the inter-depot transportation problem having the regional transportation portion incorporated is created (S104).

Then, the inter-depot transportation computing section 40 sets up the transport means set created by the transport means transforming section 42 at step 102 and the transport request set created by the transport request transforming section 44 at step 104 in the transformation model created by the transportation model transforming section 46 at step 101, thereby solving the inter-depot transportation problem having the regional transportation section incorporated (S106). As a result, the solution of the inter-depot transportation portion, namely, the transportation plan for each delivery order and each transport means, and the time window for the regional transportation portion are computed (S108). The regional transportation computing section 30 computes the transportation plan for each delivery order in the each regional transportation by applying the time window of the regional transportation portion for each delivery order solved by the inter-depot transportation computing section 40 to the regional transportation model for each region stored in the transportation model storage section 10 (S110).

Then, the inter-depot transportation computing section 40 extracts the time necessary for the regional transportation for each delivery order from the transportation plan of the regional transportation computed by the regional transportation computing section 30, subtracts the time necessary for the regional transportation from the time zone given to the total physical distribution of the delivery order, namely, the time window in the end-to-end transport request, and solves the inter-depot transportation problem again, based on the time zone after subtraction and the inter-depot transportation model before adding the regional representative node. And the previous solution of the inter-depot transportation problem is replaced with the newly computed solution of the inter-depot transportation problem (S112). Thereby, the inter-depot transportation computing section 40 optimizes the solution of the inter-depot transportation problem.

The regional transportation computing section 30 extracts the collection and delivery time (departure time or arrival time) at the depot for each delivery order from the solution of the inter-depot transportation problem newly computed at step 112, and solves the transportation plan for each delivery order again in the regional transportation, based on the extracted collection and delivery time and the regional transportation model before adding the regional representative node. And the previous transportation plan in the regional transportation is replaced with the newly computed transportation plan of the regional transportation (S114). Thereby, the regional transportation computing section 30 optimizes the solution of the regional transportation problem. Lastly, the output section 50 outputs the end-to-end transportation plan for each delivery order (S116). After the above processings, this flow is ended. The transportation problem solving device 100 performs the operation in accordance with the above procedure to output the transportation plan in which the end-to-end physical distribution problem is optimized.

With this embodiment, the reduced transportation cost is expected due to the enlarged time window of the inter-depot transportation portion. Also, when there is a margin for the time limit of delivery, the collection and delivery date for each delivery order in the regional transportation is appropriately decided to minimize the required number of vehicles for the regional transportation. As a result, the cost of the end-to-end physical distribution is minimized.

Figure 17:
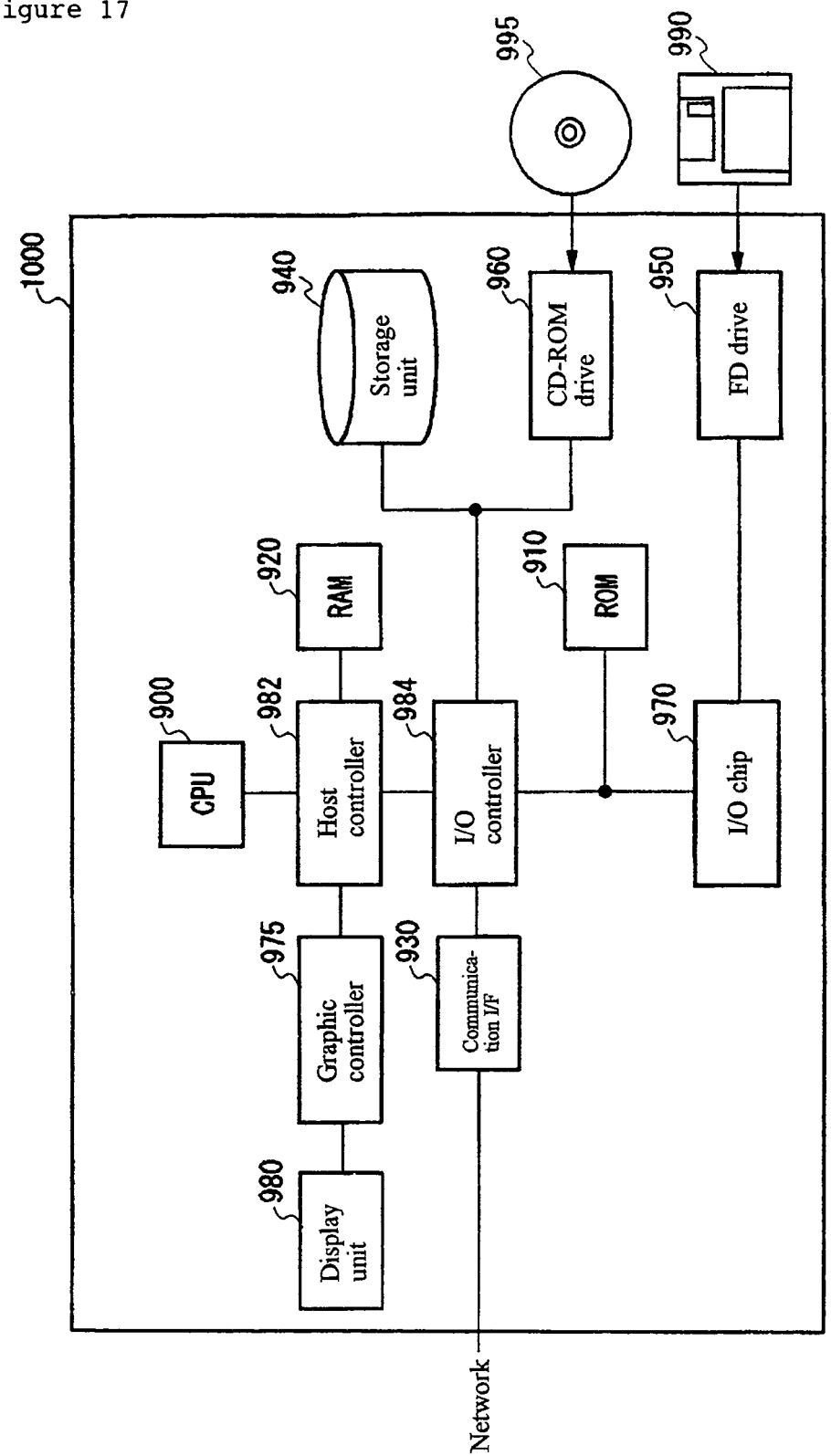
FIG. 17 is a diagram showing one example of the hardware configuration of a computer 1000 according to an embodiment of the invention.

FIG. 17 is a diagram showing one example of the hardware configuration of a computer 1000 according to this embodiment of the invention. The computer 1000 according to this embodiment comprises a CPU peripheral portion having a CPU 900, a RAM 920, a graphic controller 975, and a display unit 980, which are interconnected by a host controller 982, an input/output portion having a communication interface 930, a storage unit 940, and a CD-ROM drive 960 connected to a host controller through an input/output controller 984, and a legacy input/output portion having a ROM 910, a flexible disk drive 950 and an input/output chip 970 connected to the input/output controller 984.

The host controller 982 connects the RAM 920 with the CPU 900 and the graphic controller 975 to access the RAM 920 at high transfer rate. The CPU 900 operates based on a program stored in the ROM 910 and the RAM 920 to control each component. The graphic controller 975 acquires the image data produced on a frame buffer provided within the RAM 920 by the CPU 900, and displays it on the display unit 980. Alternatively, the graphic controller 975 may comprise internally a frame buffer for storing the image data produced by the CPU 900.

The input/output controller 984 connects the host controller 982 with the communication interface 930, the storage unit 940, and the CD-ROM drive 960 which are relatively high speed input/output devices. The communication interface 930 communicates via a network with the other equipment. The storage unit 940 stores the programs and data used by the CPU 900 within the computer 1000. The CD-ROM drive 960 reads the program or data from the CD-ROM 995 and provides it via the RAM 920 to the storage unit 940.

Also, the input/output controller 984 connects the ROM 910 with the input/output units having relatively low speed such as the flexible disk drive 950 and the input/output chip 970. The ROM 910 stores a boot program executed when the computer 1000 is started, and the program dependent on the hardware of the computer 1000. The flexible disk drive 950 reads the program or data from a flexible disk 990, and provides it via the RAM 920 to the storage unit 940. The input/output chip 970 connects the flexible disk drive 950 or a variety of input/output devices via a parallel port, a serial port, a keyboard port, and a mouse port.

The program provided via the RAM 920 to the storage unit 940 is stored in a recording medium such as the flexible disk 990, CD-ROM 995 or IC card and provided to the user. The program is read from the recording medium, installed via the RAM 920 in the storage unit 940 within the computer 1000, and executed by the CPU 900.

The program installed in the computer 1000 and enabling the computer 1000 to operate as the transportation problem solving device 100 comprises a transportation model storage module, a transformation module, an inter-depot transportation computing module, a regional transportation computing module, and an output module. These programs or modules enable the computer 1000 to operate as the transportation model storage section 10, the transformation section 20, the inter-depot transportation computing section 40, the regional transportation computing section 30, and the output section 50.

The transformation module has a transportation model transformation module, a transport means transformation module, and a transport request transformation module. These modules enable the computer 1000 to operate as the transportation model transformation section 46, the transport means transformation section 42 and the transport request transformation section 44.

The above programs or modules may be stored in an external storage medium. Examples of the storage medium may include flexible disk 990, CD-ROM 995, optical recording media such as DVD and PD, optical magnetic recording medium such as MD, a tape medium, and semiconductor memory such as IC card. Also, a hard disk or RAM provided in the server system connected to a dedicated communication network or the Internet may be employed as the recording medium, and the program may be distributed via the network to the computer 1000.

Though the embodiments of this invention have been described above, the technical scope of the invention is not limited to the embodiments as described above. Various modifications or improvements may be made to those embodiments by a person skilled in the art. Such modifications or improvements may be included within the technical field of the invention as defined in the Claims of the invention.

With the embodiments as described above, the transportation problem solving device, the transportation problem solving method, and its program and recording medium may be realized as specified in the following items.

(Item 1) A transportation problem solving device for solving a transportation problem to optimize the physical distribution consisting of a regional transportation in which transport means belonging to a depot that resides for each region collects or delivers the delivery order while making the round of a plurality of collection and delivery spots belonging to the depot, and an inter-depot transportation in which transport means allocated between each depot transports a transport request for delivery order between the each depot in a plurality of regions, comprising a transformation section for adding a regional representative node representing the plurality of collection and delivery spots belonging to the depot to a model of the inter-depot transportation, and incorporating the regional transportation between each of the plurality of collection and delivery spots belonging to the depot and the depot into a part of the model of the inter-depot transportation as the inter-depot transportation between the depot and the regional representative node, an inter-depot transportation computing section for solving the transportation problem, based on a transformation model in which the regional transportation is incorporated into the inter-depot transportation, and computing a transportation plan for each delivery order in an inter-depot transportation portion, when a plurality of transport requests are input, and an output section for outputting the transportation plan computed by the inter-depot transportation computing section.

(Item 2) The transportation problem solving device according to item 1, further comprising the inter-depot transportation computing section for computing a time window for each delivery order between the depot and the regional representative node, a regional transportation computing section for computing a transportation plan for each delivery order in the regional transportation, based on the time window for each delivery order between the depot and the regional representative node that is solved by the inter-depot transportation computing section, and the model of the regional transportation, and the output section for outputting the transportation plan for each delivery order that is computed by the regional transportation computing section.

(Item 3) The transportation problem solving device according to item 2, wherein the inter-depot transportation computing section extracts the time necessary for the regional transportation for each delivery order from the transportation plan for the regional transportation computed by the regional transportation computing section, subtracts the time necessary for the regional transportation from the time zone given to the total physical distribution for the delivery order, solves the inter-depot transportation problem, based on the time zone after subtraction and the model of inter-depot transportation before adding the regional representative node, and replaces the previous transportation plan of the inter-depot transportation problem with a newly obtained solution of the inter-depot transportation problem, and the output section outputs the resultant solution replaced by the inter-depot transportation computing section.

(Item 4) The transportation problem solving device according to item 3, wherein the regional transportation computing section extracts the collection and delivery time for each delivery order in the depot from the newly obtained solution of the inter-depot transportation problem, further computes a transportation plan for each delivery order, based on the extracted collection and delivery time and the model of the regional transportation, and replaces the previous transportation plan with the newly obtained transportation plan, and the output section outputs the resultant transportation plan replaced by the regional transportation computing section.

(Item 5) The transportation problem solving device according to item 1, wherein the transformation section further adds two intermediate nodes between the depot and the regional representative node in the model of the inter-depot transportation, and the inter-depot transportation computing section solves the transportation problem so that delivery of delivery order from the depot to the regional representative node and collection of delivery order from the regional representative node to the depot are made through the two intermediate nodes in the same order.

(Item 6) The transportation problem solving device according to item 5, wherein the inter-depot transportation computing section employs the average round time of each transport means belonging to the depot in making the round of collection and delivery spots as the required time taken for transportation between the two intermediate nodes.

(Item 7) The transportation problem solving device according to item 5, wherein the inter-depot transportation computing section employs the cost of the transport means in making the round of collection and delivery spots as the cost taken for transport means between the two intermediate nodes.

(Item 8) The transportation problem solving device according to item 5, wherein the inter-depot transportation computing section solves the transportation problem, supposing that the cost and the required time for transportation between the two intermediate nodes and the depot and between the two intermediate nodes and the regional representative node are equal to zero.

(Item 9) The transportation problem solving device according to item 5, wherein the inter-depot transportation computing section employs the maximum payload of the transport means belonging to the depot multiplied by a factor larger than 1 as the maximum load capacity in the transport means between the two intermediate nodes.

(Item 10) A transportation problem solving method for solving a transportation problem to optimize the physical distribution consisting of a regional transportation in which transport means belonging to a depot that resides for each region collects or delivers the delivery order while making the round of a plurality of collection and delivery spots belonging to the depot, and an inter-depot transportation in which transport means allocated between each depot transports a transport request for delivery order between the each depot in a plurality of regions, the method comprising a transformation step of adding a regional representative node representing the plurality of collection and delivery spots belonging to the depot to a model of the inter-depot transportation, and incorporating the regional transportation between each of the plurality of collection and delivery spots belonging to the depot and the depot into a part of the model of the inter-depot transportation as the inter-depot transportation between the depot and the regional representative node, an inter-depot transportation computing step of solving the transportation problem, based on a transformation model in which the regional transportation is incorporated into the inter-depot transportation, and computing a transportation plan for each delivery order in the inter-depot transportation problem, when a plurality of transport requests are input, and an output step of outputting the transportation plan computed at the inter-depot transportation computing step.

(Item 11) A computer program implementing a transportation problem solving method for solving a transportation problem to optimize the physical distribution consisting of a regional transportation in which transport means belonging to a depot that resides for each region collects or delivers the delivery order while making the round of a plurality of collection and delivery spots belonging to the depot, and an inter-depot transportation in which transport means allocated between each depot transports a transport request for delivery order between the each depot in a plurality of regions, the program comprising a transformation function of adding a regional representative node representing the plurality of collection and delivery spots belonging to the depot to a model of the inter-depot transportation, and incorporating the regional transportation between each of the plurality of collection and delivery spots belonging to the depot and the depot into a part of the model of the inter-depot transportation as the inter-depot transportation between the depot and the regional representative node, an inter-depot transportation computing function of solving the transportation problem, based on a transformation model in which the regional transportation is incorporated into the inter-depot transportation, and computing a transportation plan for each delivery order in the inter-depot transportation problem, when a plurality of transport requests are input, and an output function of outputting the transportation plan computed by the inter-depot transportation computing function.

(Item 12) A recording medium recording the program according to item 11.

DESCRIPTION OF SYMBOLS

10 . . . Transportation model storage section
20 . . . Transformation section
30 . . . Regional transportation computing section
40 . . . Inter-depot transportation computing section
42 . . . Transport means transforming section
44 . . . Transport request transforming section
46 . . . Transportation model transforming section
50 . . . Output section
100 . . . Transportation problem solving device
200 . . . Collection and delivery spot
300 . . . Depot
900 . . . CPU
910 . . . ROM
920 . . . RAM
930 . . . Communication interface
940 . . . Storage unit
950 . . . Flexible disk drive
960 . . . CD-ROM drive
970 . . . Input/output chip
975 . . . Graphic controller
980 . . . Display unit
982 . . . Host controller
984 . . . Input/output controller
986 . . . Input unit
990 . . . Flexible disk
995 . . . CD-ROM
1000 . . . Computer

The invention claimed is:

1. A transportation problem solving method comprising:
storing, by a transportation model storage of a transportation problem solving system, multiple regional transportation models for solving regional transportation problems associated with transportation of delivery orders, each regional transportation model associated with a corresponding one of multiple regions;
storing, by said transportation model storage, an inter-depot transportation model for solving inter-depot transportation problems associated with said transportation of said delivery orders;
generating, by a transformation section of said transportation problem solving system, a transformation model by incorporating said regional transportation models into portions of said inter-depot transportation model, said incorporating comprising adding to each depot in said inter-depot transportation model a regional representative node that represents a plurality of collection and delivery spots in a region associated with said depot and further adding two intermediate nodes between said depot and said regional representative node;
computing, by an inter-depot transportation computing section of said transportation problem solving system and based on said transformation model, an inter-depot transportation plan for inter-depot transportation of said delivery orders and time windows for regional transportation of said delivery orders, said inter-depot transportation plan further being computed so that said delivery orders are transported through said two intermediate nodes in a same order during both transportation of said delivery orders from said depot to said regional representative node and-from said regional representative node to said depot;
computing, by a regional transportation computing section and based on said regional transportation models and said time windows, a schedule for collection and delivery of said delivery orders from and to collection and delivery spots in said regions; and
outputting, by an output section of said transportation problem solving system, said inter-depot transportation plan and said schedule for collection and delivery.

2. The transportation problem solving method according to claim 1, said computing of said inter-depot transportation plan comprising employing an average round time of transport means associated with said depot in making a round of said plurality of collection and delivery spots as a required time taken for transportation between said two intermediate nodes.

3. The transportation problem solving method according to claim 1, said computing of said inter-depot transportation plan comprising employing a cost of transport means associated with said depot in making a round of said plurality of collection and delivery spots as a cost taken for transportation between said two intermediate nodes.

4. The transportation problem solving method according to claim 1, further comprising solving said transportation problem, when a cost and a required time for transportation between said two intermediate nodes and said depot and between said two intermediate nodes and said regional representative node are equal to zero.

5. The transportation problem solving method according to claim 1, said computing of said inter-depot transportation plan comprising employing a maximum payload of a transport means associated with said depot multiplied by a factor larger than 1 as a maximum load capacity in a transport means between said two intermediate nodes.

6. A transportation problem solving device comprising:
a computer storing:
a transportation model storage storing multiple regional transportation models for solving regional transportation problems associated with transportation of delivery orders, each regional transportation model associated with a corresponding one of multiple regions, said transportation model storage further storing an inter-depot transportation model for solving inter-depot transportation problems associated with said transportation of said delivery orders;
a transformation section configured to generate a transformation model by incorporating said regional transportation models into portions of said inter-depot transportation model, said incorporating comprising adding to each depot in said inter-depot transportation model a regional representative node that represents a plurality of collection and delivery spots in a region associated with said depot; and
an inter-depot transportation computing section configured to compute, based on said transformation model, an inter-depot transportation plan for inter-depot transportation of said delivery orders and further computing time windows for regional transportation of said delivery orders,
said transformation section further configured to add, during said incorporating, two intermediate nodes between said depot and said regional representative node, and
said inter-depot transportation computing section further configured to compute said inter-depot transportation plan so that said delivery orders are transported through said two intermediate nodes in a same order during both transportation of said delivery orders from said depot to said regional representative node and from said regional representative node to said depot;
a regional transportation computing section configured to compute, based on said regional transportation models and said time windows, a schedule for collection and delivery of said delivery orders from and to collection and delivery spots in said regions; and
an output section configured to output said inter-depot transportation plan and said collection and delivery schedule.

7. The transportation problem solving device according to claim 6, said inter-depot transportation computing section employing, during said computing of said inter-depot transportation plan, an average round time of transport means associated with said depot in making a round of said plurality of collection and delivery spots as a required time taken for transportation between said two intermediate nodes.

8. The transportation problem solving device according to claim 6, said inter-depot transportation computing section further employing, during said computing of said inter-depot transportation plan, a cost of transport means associated with said depot in making a round of said plurality of collection and delivery spots as a cost taken for transportation between said two intermediate nodes.

9. The transportation problem solving device according to claim 6, said inter-depot transportation computing section solving said transportation problem, when a cost and a required time for transportation between said two intermediate nodes and said depot and between said two intermediate nodes and said regional representative node are equal to zero.

10. The transportation problem solving device according to claim 6, said inter-depot transportation computing section employing a maximum payload of a transport means associated with said depot multiplied by a factor larger than 1 as a maximum load capacity in a transport means between said two intermediate nodes.

11. The transportation problem solving device of claim 6, said transformation section comprising:
a transportation model transformation section that transforms end-to-end transportation models by replacing the models of regional transportation models stored in the transportation model storage with portions of the model of inter-depot transportation;
a transport means transformation section that transforms regional transports means into inter-depot transport means; and
a transport request transformation section for dividing each end-to-end transport request into a regional transportation request and an inter-depot transportation request.

12. A non-transitory program storage device readable by machine, tangibly embodying a program of instructions executable by said machine to implement a transportation problem solving method, said method comprising:
storing multiple regional transportation models for solving regional transportation problems associated with transportation of delivery orders, each regional transportation model associated with a corresponding one of multiple regions;
storing an inter-depot transportation model for solving inter-depot transportation problems associated with said transportation of said delivery orders;
generating a transformation model by incorporating said regional transportation models into portions of said inter-depot transportation model, said incorporating comprising adding to each depot in said inter-depot transportation model a regional representative node that represents a plurality of collection and delivery spots in a region associated with said depot and further adding two intermediate nodes between said depot and said regional representative node; and
computing, based on said transformation model, an inter-depot transportation plan for inter-depot transportation of said delivery orders and time windows for regional transportation of said delivery orders, said inter-depot transportation plan further being computed so that said delivery orders are transported through said two intermediate nodes in a same order during both transportation of said delivery orders from said depot to said regional representative node and from said regional representative node to said depot;
computing, based on said regional transportation models and said time windows, a schedule for collection and delivery of said delivery orders from and to collection and delivery spots in said regions; and outputting said inter-depot transportation plan and said schedule for collection and delivery.

* * * * *